March 2, 1948.  C. D. SCHERMULY ET AL  2,437,211
ROCKET
Filed July 25, 1944
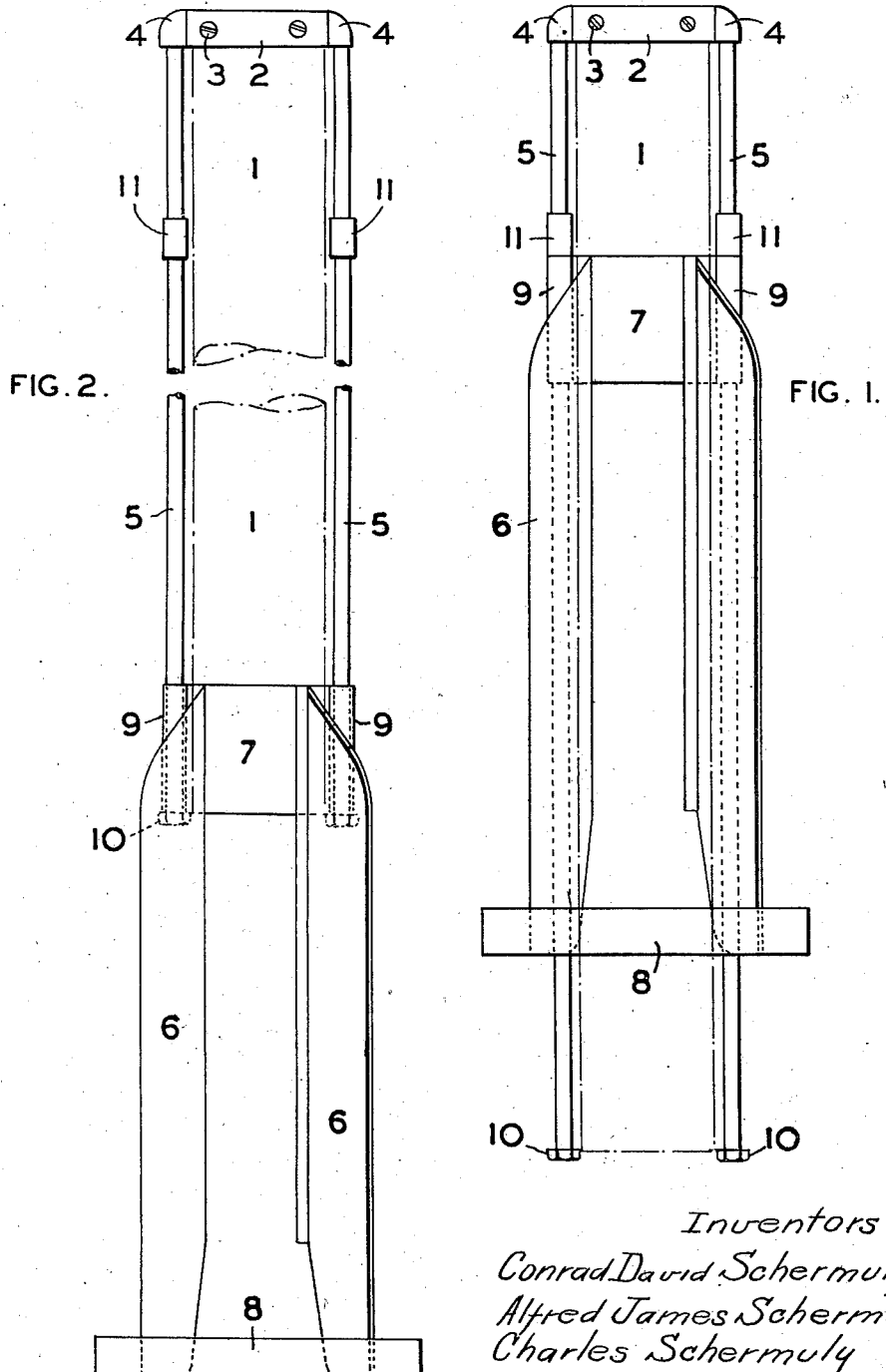
Inventors
Conrad David Schermuly
Alfred James Schermuly
Charles Schermuly
by their attorneys
Howson and Howson Patented Mar. 2, 1948

2,437,211

UNITED STATES PATENT OFFICE 2,437,211

ROCKET

Conrad David Schermuly, Alfred James Schermuly, and Charles Schermuly, Parkgate, Newdigate, England, assignors to The Schermuly Pistol Rocket Apparatus Limited, Parkgate, Newdigate, Surrey, England, a British company Application July 25, 1944, Serial No. 546,482
In Great Britain June 23, 1943

4 Claims. (Cl. 102—50)

This invention relates to rockets having a tail for steadying the rocket in flight and has for its object to provide a construction of tail which allows the rocket to be packed into a smaller space than hitherto.

According to this invention a rocket comprises a casing, a plurality of rods secured adjacent the forward end of the casing and a tail unit slidably mounted on said rods so that it can move from a position in which it is substantially entirely within the length of the casing to a position in which it projects beyond the rear end of the casing.

The tail unit may comprise at its forward end a collar surrounding the rocket casing and provided with sleeves adapted to slide along the rods, the said rods being provided with stops to limit the movement of the tail unit.

The invention will be described with reference to the accompanying drawings which show one method of mounting the sliding tail unit on a rocket casing, but the invention is not limited to the particular mounting shown.

Figure 1 is a view showing the tail in closed (or packed) position, while Figure 2 is a view showing the tail in extended (or flight) position.

The rocket casing 1 is shown in broken lines. A ring 2 is secured adjacent the forward end of the casing 1, for example by screws 3. Brazed or otherwise secured to the ring 2 are two lugs 4 to each of which is secured a rod 5. More than two such lugs and rods may be provided if desired. The rods are adapted to carry slidably thereon a tail unit. The tail unit is composed of a number of fins 6 (four in the example shown) secured at their forward end to a collar 7 and at their rear end to a spacing band 8; the collar 7 is provided with two sleeves 9 adapted to slide along the rods 5.

After the tail unit has been mounted on the rods 5, stops 10, which may consist of nuts 10, are secured to the rear end of the rods 5 to limit rearward movement of the tail unit. If desired forward stops 11 may also be provided on the rods 5 to limit forward movement of the tail unit.

Prior to using the rocket, the tail unit is slid forward until the sleeves 9 abut against the forward stops 11 so that the overall length of the rocket is equal to the length of the rocket casing.

When the rocket is fired from a discharger or pistol, the tail unit slides rearwardly until the sleeves 9 abut against the stops 10, the tail unit thus occupying the correct position for stabilising the flight of the rocket.

We claim:

1. A rocket comprising a casing, a ring secured to the forward end of said casing, a plurality of lugs secured to said ring, a rod secured to each of said lugs and extending rearwardly therefrom, a collar surrounding said casing, a plurality of sleeves secured to said collar, each of said sleeves being adapted to slide on one of said rods, a plurality of fins secured at their forward end to said collar, a spacing band secured to the rear ends of said fins and stops secured to the rear ends of said rods to limit rearward movement of said sleeves.

2. A rocket as claimed in claim 1 comprising stops secured towards the forward ends of said rods to limit forward movement of said sleeves.

3. A rocket comprising a casing, and a plurality of rods each secured adjacent the forward end of said casing and extending rearwardly therefrom in spaced relation to said casing, in combination with a tail unit comprising a collar surrounding the rocket casing and sleeves adapted to slide along the rods.

4. A rocket comprising a casing and a plurality of rods each secured at its front end only adjacent the forward end of said casing and extending rearwardly therefrom in spaced parallel relation to said casing to receive a discharger barrel between said rods and casing, in combination with a tail unit comprising a collar surrounding the casing and provided with sleeves adapted to slide along the rods, and stops at the rear end of said rods to limit rearward movement of said tail unit.

CONRAD DAVID SCHERMULY.
ALFRED JAMES SCHERMULY.
CHARLES SCHERMULY.

REFERENCES CITED

The following references are of record in the file of this patent:

UNITED STATES PATENTS

| Number | Name | Date |
|---|---|---|
| 2,344,957 | Anzalone | Mar. 28, 1944 |
| 2,397,114 | Anzalone | Mar. 26, 1946 |

FOREIGN PATENTS

| Number | Country | Date |
|---|---|---|
| 126,664 | Great Britain | May 22, 1919 |